UNITED STATES PATENT OFFICE.

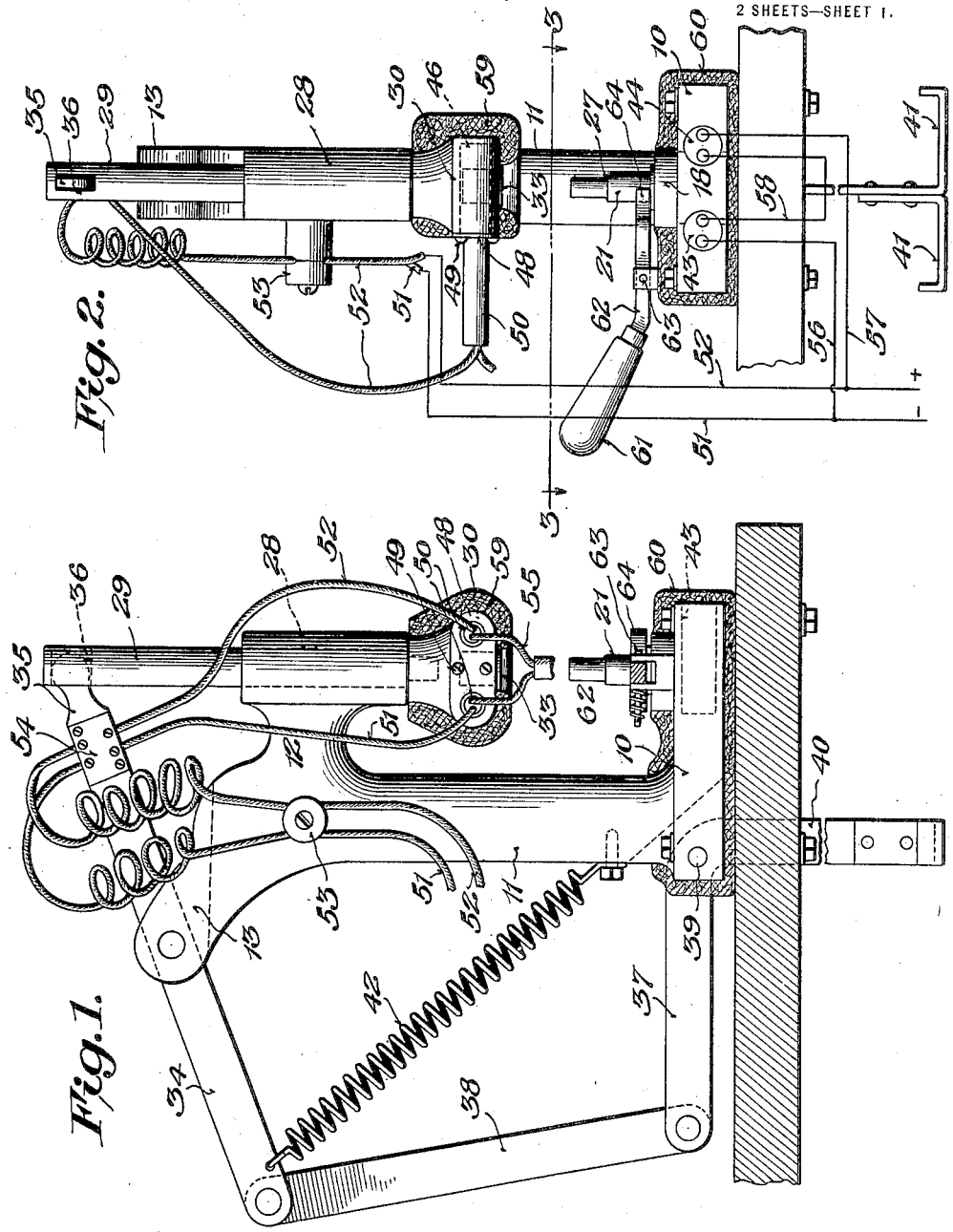

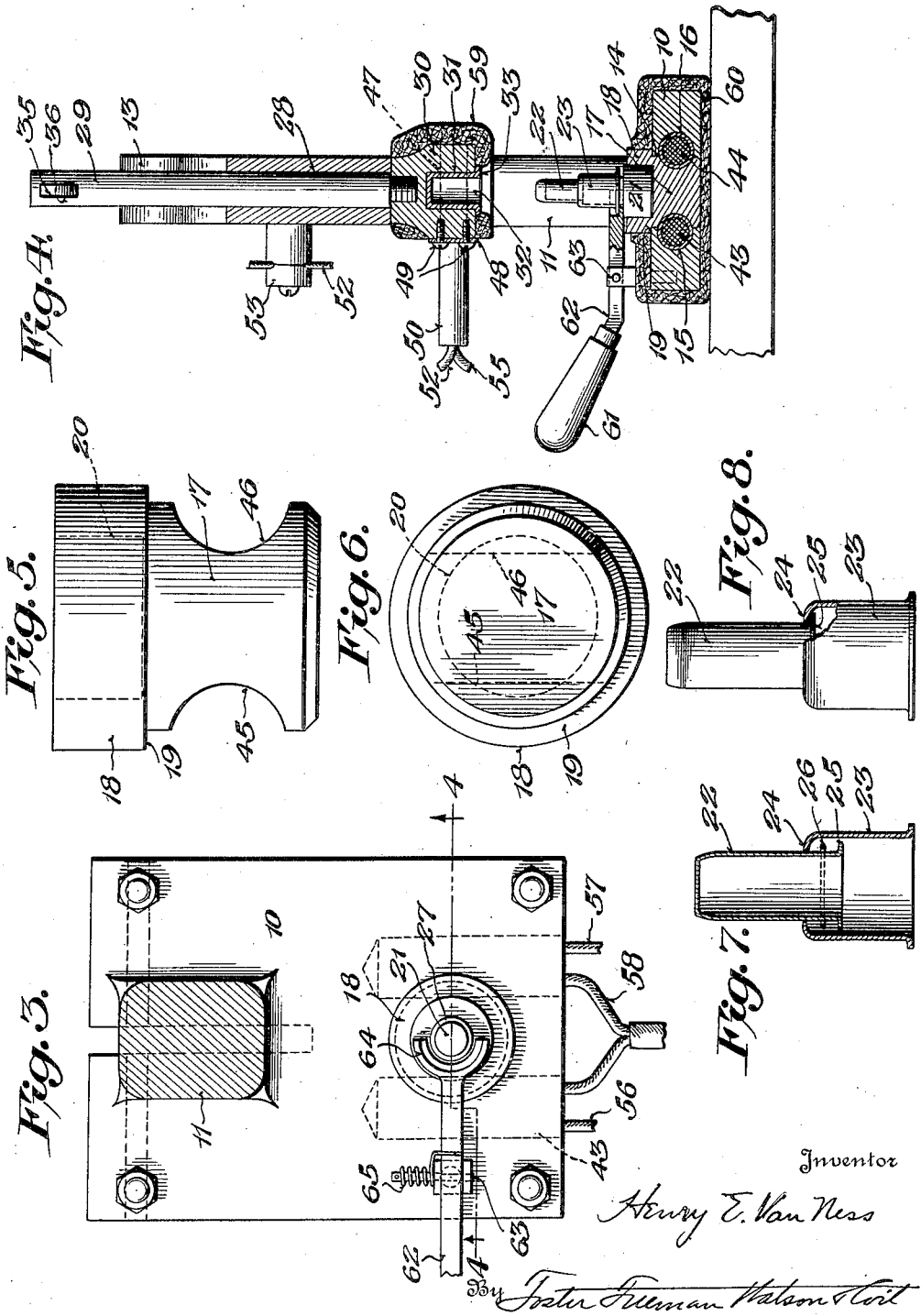

HENRY E. VAN NESS, OF ELMIRA, NEW YORK.

SOLDERING DEVICE FOR FUSE-SOCKETS.

1,390,315.　　　　　　Specification of Letters Patent.　Patented Sept. 13, 1921.

Application filed January 23, 1919. Serial No. 272,761.

*To all whom it may concern:*

Be it known that I, HENRY E. VAN NESS, a citizen of the United States, and residing at Elmira, Chemung county, State of New York, have invented certain new and useful Improvements in Soldering Devices for Fuse-Sockets, of which the following is a specification.

The present invention relates to soldering machines and more particularly to such a machine especially adapted for soldering together the parts of fuse sockets. The objects and features of novelty will be apparent from the description taken in connection with the drawings in which:—

Figure 1 is a side elevation of a machine constructed in accordance with the present invention;

Fig. 2 is a front elevation of the machine, part of the wiring to the heating units being shown diagrammatically;

Fig. 3 is a sectional plan view taken substantially on the line 3—3 of Fig. 2;

Fig. 4 is a sectional elevation through the machine taken substantially on the line 4—4 of Fig. 3;

Fig. 5 is a side elevation of the base forming part of the lower anvil;

Fig. 6 is a top plan of said base;

Fig. 7 is a sectional elevation through a fuse socket before the parts have been soldered together; and Fig. 8 is an elevation of a soldered socket, a portion thereof being broken away to illustrate the soldered connection.

Referring to the drawings the form of machine illustrated comprises a base 10 having a post 11 at one side thereof, this post at its upper end having an arm 12 projecting horizontally therefrom at one side and a bifurcated arm 13 at the other. The base 10 is formed with a circular opening 14 and two openings 15 and 16 intersecting said opening 14. An anvil is set into the base and as shown comprises a base portion having a shank 17 fitted in the opening 14 and a head 18 which forms a shoulder 19 bearing on the top of the base and holding the anvil against downward displacement. The head 18 of the anvil is formed with a circular recess 20 for an extension or plug 21.

Referring to Fig. 7 it will be seen that the socket adapted to be soldered on this machine consists of the two sections 22 and 23 having the overlapping flanges 24 and 25. These two parts are soldered together by placing a ring of soft solder 26 between the two flanges 24 and 25 and then forcing the flanges toward each other and applying heat. The result of this operation is illustrated in Fig. 8.

The plug 21 is shaped to fit the work, that is, in the present embodiment of the invention, the fuse socket is placed on the plug, the height of the latter being such that the bottom of the socket is a slight distance from the upper surface of the base of the anvil. The shoulder 27 of the plug is designed to bear against the flange 23 of the fuse socket and, as is described hereinafter, the flange 24 is forced toward the flange 23 so that the parts are properly held together during the soldering operation.

Preferably, the base of the anvil is formed from a material of high specific heat such as copper and the plug is made from a material which is not affected by the solder such as aluminum.

The arm 12 of the frame of the machine is formed with a vertical bore 28 and the rod 29 is mounted to reciprocate therein and has an anvil 30 secured to its lower end, preferably made from a material of high specific heat, as copper. As shown, this anvil is formed with the circular recess 31 which is lined with an aluminum bushing 32, the size of this recess being such that it fits down over the top section 22 of the socket with the lower end 33 of the bushing bearing against the flange 24 of the fuse socket. For the purpose of forcing the upper anvil toward the lower anvil a lever 34 is pivoted in the bifurcated arm 13 and has one end 35 thereof engaging in a slot 36 near the top of the arm 29 and the other end connected to the arm 37 of a bell crank lever by means of a link 38. The bell crank lever is pivoted at 39 in the base of the frame and has an arm 40 extending downwardly from said base and formed with the pedals 41 positioned to be actuated by the feet of the operator. It will be seen when the pedals 41 are pushed toward the left, as viewed in Fig. 1 the upper anvil will be moved down toward the lower anvil. The return or raising movement of the anvil is accomplished by means of a spring 42 interposed between the lever 34 and the frame of the machine. According to the present invention the anvils are independently heated. For this purpose the lower anvil has associated therewith the two electric heating units 43 and 44. The unit 43 is disposed in the opening 15 and the unit 44 in the opening 16 of the base. In order that these units may be positioned as close as possible to the anvil, the shank 17 thereof is formed with recesses 45 and 46 which are flush with the interior surfaces of the openings 15 and 16 so that the heating units 43 and 44 are partially disposed in the anvil.

In a similar manner the upper anvil is provided with two electric heating units 47 disposed on opposite sides of the recess 31. A plate 48 is secured to the side of the anvil as by means of screws 49 to hold the units in position, and this plate has the tubes 50 projecting therefrom for the purpose of affording a housing for the wires supplying current to the heating units.

As shown in the Figs. 1 and 2, the current may be supplied to the heating units of the upper anvil through the wires 51 and 52 which are secured to the side of the post 11 on an insulating post 53 and thence pass with considerable slack to a securing means 54 near the upper end of the lever 34 and thence to the heating units 46. The wire 51 passes through the tube 50 to one of the heating units 46 and the wire 52 passes through the other tube 50 to the other heating unit 46, the two units being connected by a conductor 55. It will be observed that the mounting of the wires on the supports 53 and 54 in the manner before stated keeps them out of the way of the operator and possible injury from the heated parts of the machine. The lower heating units are supplied with current in a similar manner. Thus a conductor 56 may extend from the wire 51 to the heating unit 43 and a conductor 57 may extend from the wire 52 to the other heating unit 44. The two units are connected in series by a wire 58. Although a particular arrangement of wiring has been described, it is obvious that the invention is not limited to this disposition but that the heating units may be supplied with current in other ways.

In order to prevent radiation of heat from the two anvils the upper anvil is provided with a heat insulating jacket 59 and the lower anvil with a similar jacket 60.

In the operation of the machine after the parts of the socket have been positioned, as shown in Fig. 7, they are placed on the plug 21. Then the operator pushes on the pedals 41 thereby causing the upper anvil to descend so that the bushing 32 fits over the upper part 22 of the socket, the lower end of the bushing contacting with flange 24 of the socket and applying pressure to force it against the flange 23 which rests on the shoulder 27 of the plug. This pressure, together with the heat supplied from the anvils, solders the two flanges together. The spring 42 now acts to raise the upper anvil and the soldered socket may be projected from the plug 21 by depressing the handle 61 of a lever 62 pivoted at 63 on the base of the machine. This lever, as clearly shown in Fig. 3, is formed with a yoke 64 at one end which normally is positioned just below the lower end of the fuse socket so that when this yoke is raised the socket will be forced off the plug 21. The lever is normally held with the yoke down by a spring 65.

Although a specific organization and arrangement of parts has been disclosed it is to be understood that the invention is not limited to the details thereof but includes changes and modifications which come within the scope of the appended claims.

Having thus described the invention what is claimed as new and desired to be secured by Letters Patent is:—

1. A machine of the class described including in combination, a frame having a base, an anvil set into said base comprising a base of high specific heat and an aluminum extension, heating means in said first base, a plunger mounted on the frame for movement to and from the anvil, a second anvil secured to said plunger formed to fit over said extension, and means to heat said second anvil.

2. A machine of the class described including in combination, a pair of anvils to clamp the work, one of the anvils having an aluminum plug on which the work is mounted and the other formed with an aluminum lined recess to fit over the work, and means to heat said anvils.

3. A machine of the class described including in combination, a base having an anvil of high specific heat set into the same, said anvil having a projecting lug on which the work is mounted, said base and anvil formed with complemental recesses, an electric heating unit in said recesses, a second anvil mounted to move to and from the first anvil to clamp the work, and means to heat said second anvil.

4. A machine of the class described including in combination, a frame having a base, an anvil of high specific heat set into said base having a projecting aluminum plug on which the work is mounted, a second anvil carried by the frame to slide to and from the first anvil to clamp the work formed with an aluminum lined recess to fit over the work, and electric heating units associated with each anvil.

5. A machine of the class described including in combination, a pair of coöperating anvils formed to fit the work to be soldered and clamp it therebetween, the parts of the anvil in contact with the work being aluminum, and an electric heating unit associated with each anvil.

6. A machine for soldering fuse sockets including in combination an anvil having a plug on which the socket is mounted, a second anvil mounted to move toward the first anvil and constructed to fit over the socket and exert pressure thereon, means to heat said anvils, and means to project the socket from said plug.

7. A machine of the class described including in combination, a frame having a base formed with a circular opening, an anvil of high specific heat fitted in said opening, an electric heating unit in said base and anvil, a second anvil slidably mounted on the frame, and means to move said second anvil to and from the first anvil.

8. A machine of the class described including a frame having a base formed with an opening; an anvil comprising a base of high specific heat having a head and a shank fitted in said opening, said head formed with a recess, and a projecting aluminum plug secured in said recess; a heating unit associated with said anvil; a second anvil slidably mounted on the frame having an aluminum bushed opening adapted to fit over said plug; an electric heating unit in said second anvil; and means to move the second anvil to and from the first.

In testimony whereof I affix my signature.

HENRY E. VAN NESS.